July 7, 1931.  E. DICKEY  1,813,033
ELECTRIC SYSTEM
Filed Jan. 30, 1926
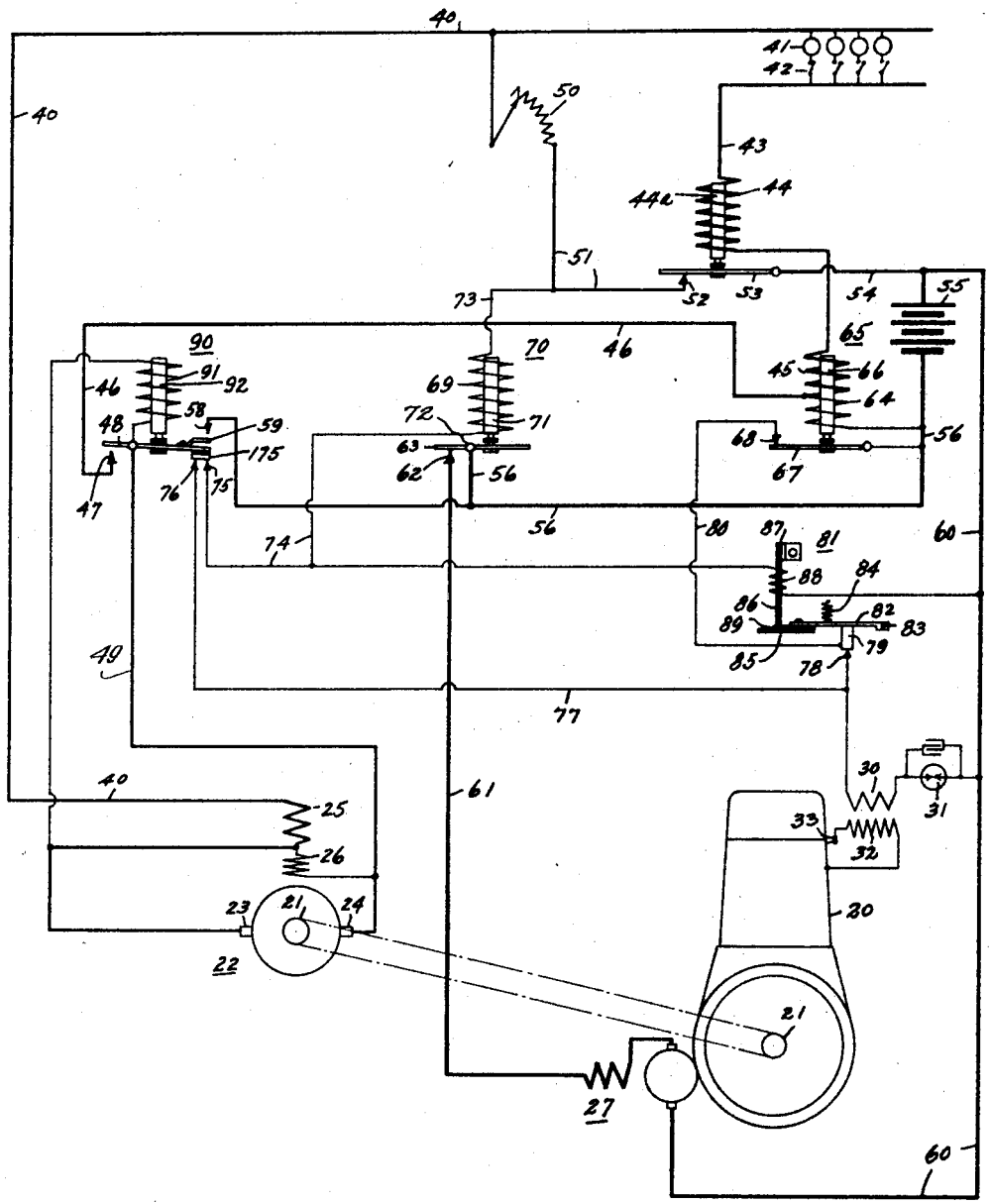
Inventor
Ernest Dickey
By Spencer Sewall & Hardman
Attorneys Patented July 7, 1931

1,813,033

UNITED STATES PATENT OFFICE

ERNEST DICKEY, OF DAYTON, OHIO, ASSIGNOR TO DELCO-LIGHT COMPANY, OF DAYTON, OHIO, A CORPORATION OF DELAWARE

ELECTRIC SYSTEM

Application filed January 30, 1926. Serial No. 84,840.

This invention relates to electrical generating systems of the type which include a generator, and a storage battery and a work circuit supplied with current by the generator. One object of the present invention is to interrupt the flow of current to the battery when the work circuit requires a certain amount of current so that the entire possible output of the generator will be delivered only to the work circuit.

Further objects and advantages of the present invention will be apparent from the following description, reference being had to the accompanying drawing, wherein a preferred form of embodiment of the present invention is clearly shown.

The figure of the drawing is a wiring diagram illustrating the present invention.

In the drawing, 20 designates an internal-combustion engine having a shaft 21 which drives a relatively high-voltage generator 22 having main brushes 23 and 24 connected with the armature of the generator, and having a series field winding 25 and a shunt field winding 26.

The engine is started by a relatively low-voltage series motor 27 which is normally disconnected from the engine, but may be connected automatically with the engine for cranking the latter whenever current is supplied to the motor; and which is automatically disconnected from the engine when the engine becomes self-operative. As various devices for automatically connecting and disconnecting the starting motor are well-known to those skilled in the art, illustration thereof is deemed unnecessary. One form of mechanical connection which may be used with this invention is described and claimed in the co-pending application of Frank F. Starr, Serial No. 47,717, filed August 3, 1925.

The engine ignition apparatus comprises an ignition coil primary 30, an ignition timer 31 and an ignition coil secondary 32 which is connected with an engine spark plug 33.

A relatively high-voltage work circuit which is supplied by the generator 22, includes wire 40, electrical translation devices 41 each controlled by a switch 42, wire 43, magnet coil 44, magnet coil 45, wire 46, switch contact 47, contact 48 and wire 49.

The battery charging circuit includes wire 40, a voltage-reducing rheostat 50, wire 51, switch contact 52, contact 53, wire 54, a relatively low-voltage storage battery 55, wire 56, wire 57, switch contacts 58 and 59, contact 48 and wire 49.

The engine cranking circuit includes battery 55, wire 60, motor 27, wire 61, contact 62, contact 63 and wire 56.

To start the engine automatically in response to a demand for current in the work circuit, one of the switches 42 is closed, thereby causing current to flow from the battery through the following circuit: battery 55, wire 54, contact 53, contact 52, wire 51, rheostat 50, wire 40, work device 41, switch 42, wire 43, magnet coil 44, magnet coil 45 and magnet coil 64. Coil 64 is of relatively high resistance and, therefore, limits the current flowing from the battery to the work device 41. The energizing of coils 45 and 64, which form part of a starting switch relay 65, causes the plunger 66 to be drawn upwardly to connect a movable contact 67 with a stationary contact 68. When contacts 67 and 68 are closed, current will flow from the battery through the magnet 69 of a starting switch 70 which includes a plunger 71 which, when moved upwardly, will cause the contact 63, which is pivoted at 72, to engage the contact 62. The circuit between the battery and the magnet 69 is as follows: battery 55, wire 54, contacts 53 and 52, wire 51, wire 73, magnet 69, wire 74, contact 75, contact 76, wire 77, contact 78, a movable contact 79, wire 80, contacts 67 and 68, and wire 56. The closing of contacts 62 and 63 will establish the cranking circuit previously described. The closing of contacts 67 and 68 will connect the ignition coil primary 30 with the storage battery through the following circuit: wire 60, timer 31, ignition primary coil 30, contact 78, contact 79, wire 80, contact 68, contact 67 and wire 56. Thus, the engine will be started by supplying ignition thereto and cranking the engine by means of the starting motor 27.

If the engine should not start within a certain length of time, abnormal discharge of the battery is prevented by a cranking cutout 81 which includes the contacts 78 and 79. The contact 79 is attached to a lever 82 which is pivoted at 83 and is urged upwardly by a spring 84. Upward movement of the lever 82 is restrained by the engagement of a non-conducting block 85 attached to the lever 82 with the lower end of a bimetallic thermostat blade 86 fixed at 87. The blade 86 is in heat-receiving relation to a heating coil 88 which is connected across the battery terminals by connecting one end of the coil 88 with the wire 60, and the other end with the wire 74. If the cranking of the engine should continue for an abnormal period, the bimetallic blade 86 will be heated sufficiently to cause it to bow toward the left, as viewed in the drawing, until the lower end of the blade 86 moves past the shoulder 89 of the nonconducting block 85. When this occurs, the lever 82 will move upwardly and separate the contact 79 from the contact 78. This operation will disconnect the coil 69 from the battery 55, so that the plunger 71 will descend by gravity to move the contact 63 away from the contact 62. Thus, the starting circuit will be interrupted.

When the engine becomes self-operative and the generator has attained a relatively high voltage, a load switch 90 will automatically connect the generator with the work circuit referred to. The switch 90 includes a magnet coil 91 having its ends connected, respectively, with the generator brushes 23 and 24. When the voltage across the brushes exceeds a certain amount, the plunger 92 of the load switch will be attracted in order to move the contacts 48 and 47 into engagement. Before contact 48 engages contact 47, the contact 59 attached to contact 48 will first engage the contact 58. This feature is provided to ensure the closing of the battery charging circuit before the work circuit is closed.

The engine cranking circuit is interrupted in response to a certain generator voltage. A contact 175 which normally bridges contacts 75 and 76 is separated from these contacts when contact 48 is moved counterclockwise as described. The circuit to the switch magnet 69 being broken, the plunger 71 descends to separate contact 63 from contact 62.

The contacts 52 and 53, the magnet 44 and a magnetizable plunger armature 44a form a battery charge controller which interrupts the battery charging circuit when the current demand in the work circuit exceeds a certain amount. In this way, the diverting of current to the battery ceases when the work circuit requires the entire maximum output of the plant.

While the form of embodiment of the invention as herein disclosed, constitutes a preferred form, it is to be understood that other forms might be adopted, all coming within the scope of the claims which follow.

What is claimed is as follows:

1. An electrical generating system, comprising in combination, a work circuit, a prime mover, a source of current, electrical apparatus associated with the prime mover and source of current, said apparatus being adapted to receive current from said source for starting the prime mover and adapted to supply current to said work circuit and said source, means for controlling the connections between said source and apparatus, and means for interrupting the flow of current from the apparatus to said source when the demand in the work circuit exceeds a certain amount.

2. An electrical generating system, comprising in combination, a work circuit, a prime mover, a source of current, electrical apparatus associated with the prime mover and adapted to receive current from said source for starting the prime mover and adapted to supply current to said work circuit and said source, circuit connections between said source and apparatus including a switch, circuit connections between said apparatus and work circuit, and means for interrupting the flow of current from the apparatus to said source when the demand in the work circuit exceeds a certain amount, said means including a current coil in latter circuit connections for actuating said switch.

3. An electrical generating system, comprising in combination, a work circuit, an internal combustion engine, a battery, electrical apparatus adapted to receive current from the battery for cranking the engine and adapted to charge the battery and supply current to the work circuit after the engine is self-operative, a battery charging circuit connecting the battery with the apparatus, a switch in said charging circuit, and means for opening said switch when the demand in the work circuit approaches the maximum output of the electrical apparatus including a magnet winding in said work circuit.

In testimony whereof I hereto affix my signature.

ERNEST DICKEY.